United States Patent

Shutt

[15] 3,686,864
[45] Aug. 29, 1972

[54] MULTIPLE FEATURE MASTER CYLINDER
[72] Inventor: Paul B. Shutt, St. Joseph, Mich.
[73] Assignee: The Bendix Corporation
[22] Filed: March 2, 1971
[21] Appl. No.: 120,145

[52] U.S. Cl. ............... 60/54.5 E, 188/349, 200/82 D
[51] Int. Cl. .......................... F15b 7/00, H01h 35/38
[58] Field of Search ........ 60/54.5 E, 54.6 E; 303/6 C; 188/349; 200/82 D

[56] References Cited

UNITED STATES PATENTS

| | | | |
|---|---|---|---|
| 3,522,706 | 8/1970 | Bueler | 60/54.5 E |
| 3,556,607 | 1/1971 | Shutt et al. | 60/54.5 E |
| 3,462,200 | 8/1969 | Lewis et al. | 60/54.5 E |
| 3,321,914 | 5/1967 | MacDuff | 188/349 |
| 3,416,315 | 12/1968 | Wortz | 60/54.6 E |
| 3,480,333 | 11/1969 | Stelzer | 303/6 C |
| 3,597,008 | 8/1971 | Falk | 60/54.5 E |
| 3,586,384 | 6/1971 | Falk | 60/54.5 E |
| 3,597,015 | 8/1971 | Stokes | 60/54.5 E |

Primary Examiner—Martin P. Schwadron
Assistant Examiner—A. M. Zupcic
Attorney—William N. Antonis and Plante, Hartz, Smith & Thompson

[57] ABSTRACT

A brake failure warning switch, a brake proportioning valve with bypass and a metering valve are provided in a single master cylinder housing. During normal brake application, the proportioning valve reduces the braking effort of the rear wheels compared to that of the front wheels. The warning device and proportioning valve are interconnected in such a manner that a failure in the front brake hydraulic system not only actuates a brake failure indicator but also holds the proportioning valve open to permit the remaining rear system to deliver its maximum braking capability. The metering valve holds off hydraulic pressure to front wheel disc brakes until sufficient pressure has built up in the rear system to engage the shoes with the brake drum, thus energizing the disc brakes at approximately the same time as the rear wheel drum brakes.

14 Claims, 5 Drawing Figures

INVENTOR
PAUL B. SHUTT
BY
ATTORNEYS

PATENTED AUG 29 1972 3,686,864

INVENTOR
PAUL B. SHUTT
BY
Plante, Hartz, Smith & Thompson
ATTORNEYS

MULTIPLE FEATURE MASTER CYLINDER

BACKGROUND OF THE INVENTION

This invention relates to a novel multi-feature master cylinder for use in a dual hydraulic vehicular braking system.

In a vehicle having a split system master cylinder, two separate fluid systems connect the master cylinder to a respective set of front and rear brakes, the object being to simultaneously actuate them. In practice, however, where disc brakes are used on front wheels and drum brakes on the rear, this simultaneity of operation does not occur. The front wheel disc brakes require very little initial actuating pressure whereas the rear drum brakes require substantial initial actuating pressure from the master cylinder to move the brake shoes into engagement with the drum. It is, therefore, desirable to provide a master cylinder for a split hydraulic vehicular braking system which embodies as a component part a metering valve to effect the pressure delay required for desired disc brake operation.

Also, as deceleration magnitude caused by braking increases, it is readily apparent to one skilled in the art that a vehicular weight shift occurs from one axle to the other. The weight shift during forward travel from the rear to the front wheels would be proportional to the deceleration rate caused by the brake application intensity. This shift dictates that proportionately less braking effort be exerted through the rear wheels thus preventing rear wheel lock-up and resultant skidding and possible loss of control over the vehicle. In furtherance of this purpose, it is therefore desirable to furnish a master cylinder for a split hydraulic vehicular braking system which includes as a component part a proportioning valve which not only provides a proportionate pressure decrease in the rear braking system to prevent wheel slide as brake application intensity during forward travel increases, but also functions to bypass proportioning effects of the valve should pressure be lost in the front braking system thus giving the maximum braking effect from the remaining rear braking system.

Additionally, where the braking master cylinder is of the split system type a malfunction in either system resulting in loss of hydraulic pressure and/or fluid loss and the attendant loss of that system braking capability could go unnoticed by the vehicle operator during routine braking applications, but lead to disastrous consequences in an emergency when total braking capability becomes mandatory.

Existing brake system failure warning devices generally function to indicate the failure only while the brakes are applied. Even if one of the systems has failed completely, the vehicle operator is apprised of this fact only during a brake application. Or, if the failure indicator remains activated upon release of the brakes, it also persists even after the defective brake system has been repaired and pressure restored until the warning device is reset by a mechanic.

It is, therefore, desirable to provide a vehicular hydraulic braking system split master cylinder containing a hydraulic system failure warning device that, once actuated by a failure in the hydraulic system, continuously warns the driver of the existing failure until the defective system is repaired. At this time, the device should automatically reset itself.

SUMMARY OF THE INVENTION

It is an object of this invention to provide a dual master cylinder for use in a dual hydraulic vehicular braking system which is capable of metering hydraulic fluid pressure to front wheel disc brakes so that they are not actuated prior to actuation of the rear drum brakes.

Another object of the invention is to provide a dual master cylinder for use in a dual hydraulic vehicular braking system which proportions brake system pressure to the rear wheel brakes depending upon the intensity of the braking application and thus the ratio of the weight transferred from the rear of the front wheel brakes of the vehicle so that premature rear wheel skid is avoided.

A further object of the invention is to provide a component proportioning valve feature which is bypassed in the event of malfunction caused by hydraulic fluid loss or other cause of hydraulic fluid pressure loss in the front wheel brakes so that the capability of the remaining rear brake system is fully utilized to aid in stopping the vehicle until the malfunctioning system can be repaired. The bypass mechanism is then automatically reset upon repair of the system to re-establish the proportioning effect.

A still further object is to provide a dual master cylinder embodying a brake system failure warning switch which is capable of indicating any predetermined excessive pressure differential between the two hydraulic brake systems resulting from fluid loss or pressure loss in one of the systems.

It is an object of this invention to provide brake failure warning indication which will be maintained continuously until normal brake application fluid pressure is restored to both systems, at which time the warning device automatically resets itself to the normal, non-actuated position with the first brake application subsequent to the repair without disassembly of the master cylinder or bleeding of the brake lines.

Another object of this invention is to provide an integral multi-feature master cylinder which is much less expensive to manufacture than individual components accomplishing the same result and wherein the components of the multi-feature master cylinder are all included in a single housing, thus conserving space and grouping all components at one central location.

DESCRIPTION OF THE PREFERRED EMBODIMENT

Figure 1:
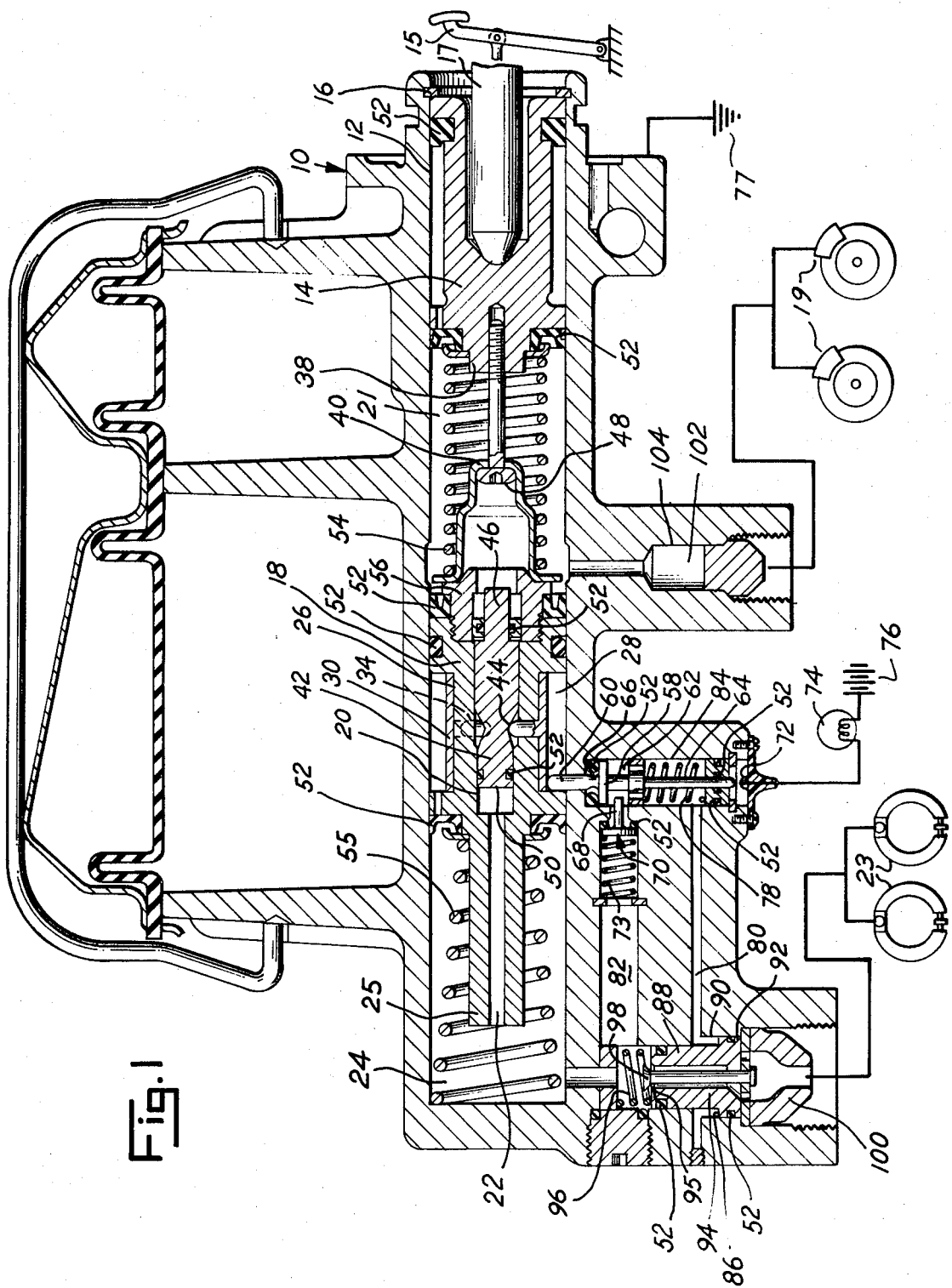
FIG. 1 is a sectional view of my master cylinder schematically connected with conventional front disc brakes and rear drum brakes of an automobile.
Figure 5:
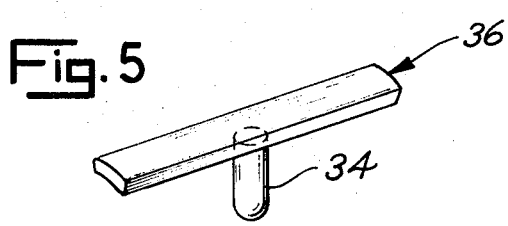
FIG. 5 illustrates an alternate construction of the actuating element for the warning switch.

Referring now to FIG. 1, a housing 10 defines a primary bore 12 containing front hydraulic system piston 14 actuated by pedal 15 through pushrod 17 for energizing front brakes 19. A retainer 16 suitably secured to housing 10 is engaged by piston 14. A rear hydraulic system piston 18 is actuated by fluid pressure in a front system pressure chamber 21 created by movement of front system piston 14, or; if there is no fluid pressure in front system pressure chamber 21, by contact of a front system piston extension 38 with a shroud 40 for energizing the rear brakes 23. The rear system piston 18 has a secondary bore 20 and an extension 25 with an axial passageway 22 therethrough communicating with the secondary bore 20 and rear system pressure chamber 24. Spool section 26 of piston 18 provides an annular cavity 28 around the piston 18 for retaining and operatively carrying expandable sleeve 30 or, in the modification of FIG. 5, lever 36.

Figure 2:
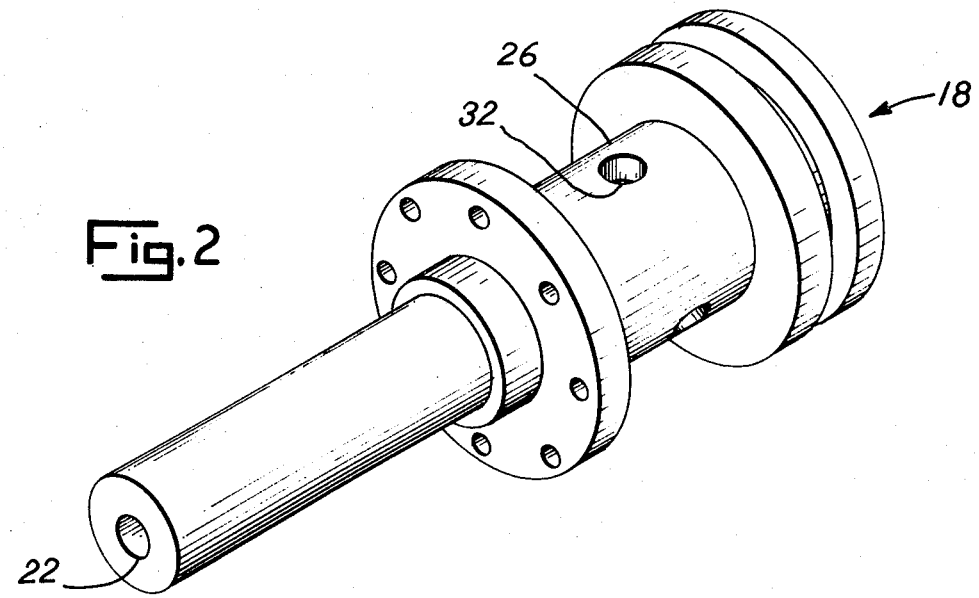
FIG. 2 illustrates an enlarged isometric view of the rear brake system piston shown removed from FIG. 1.
Figures 3, 4:
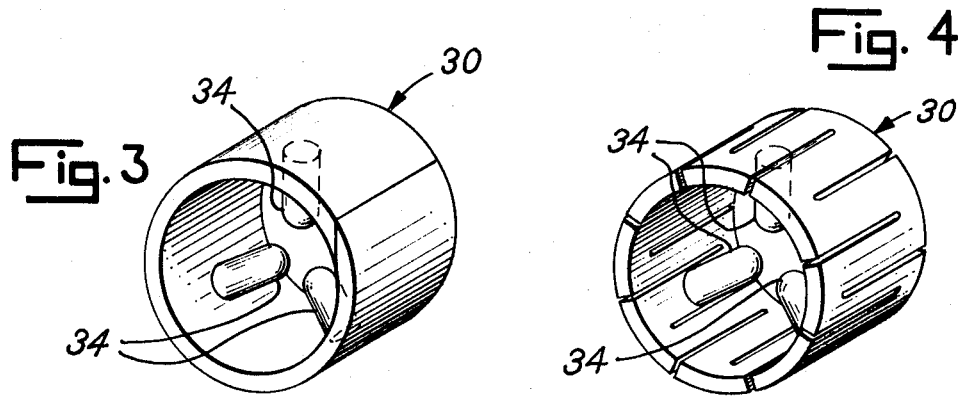
FIG. 3 illustrates an enlarged isometric view of the brake failure switch expanding sleeve actuating element shown removed from FIG. 1.
FIG. 4 depicts an alternate construction method for the expanding sleeve actuating element of FIG. 3.

FIG. 2 illustrates the radial passages 32 from the hub of the spool section 26 into secondary bore 20, through which radial projections 34 of the expandable sleeve 30 (illustrated in FIGS. 1, 2 and 3) or radial projections 34 of levers 36 (illustrated in FIG. 5) are interposed.

Fail piston 42 is reciprocably located in secondary bore 20 and has a camming surface 44 on a portion of its length for engagement with the radial projections 34. An extension 46 of the fail piston 42 provides for failure mode positioning of the piston 42, by contact with actuation stud 48 when fluid pressure is lost in the front system pressure chamber 21 or, when fluid pressure is lost in the rear system pressure chamber 24, by the fluid pressure in front system pressure chamber 21 acting on the effective area of fail piston extension 46, unopposed by any balancing force on the other end 50 of fail piston 42. Suitable conventional seals 52 are provided to effect a suitable seal between the various pistons and their corresponding bores to prevent intermixture of front and rear brake system fluid and to prevent contamination such as dirt or water from entering the mechanism. Piston return springs 54 and 55 urge front and rear system hydraulic pistons, respectively, to their base positions when no force is applied to the brake pedal 15. Piston retainer 56 provides both a stop for axial movement of fail piston 42 to the right as viewed in FIG. 1 and a pilot diameter for locating the seal 52 between the right end of rear system piston 18 and bore 12. Electrical contact 58 has an inner extension 60, notch 62, an outer extension 64, and a reduced passageway diameter 66. Passageway 66 could be produced by a number of methods; for example, a series of axial grooves converging with the diameter of inner extension 60 at some predetermined sealing point on the length. The notch 62 operatively engages the stem 68 of a toggle valve 70. A positioning spring 73 urges toggle valve 70 toward a closed position. The outer extension 64 completes an electrical circuit through an indicator contact 72 and indicator 74 from battery 76 to electrical ground 77 whenever there is pressure failure in either front brakes 19 or rear brakes 23. Contact spring 78 urges electrical contact 58 toward its base position with inner extension 60 contacting unexpanded sleeve 30 or lever 36, passageway 66 open for admission of fluid flow therethrough and notch 62 allowing toggle valve 70 to remain in the closed position. A bypass channel 80, toggle valve passage 82 and electrical contact cavity 84 provide pressure communication from rear system pressure chamber 24 to proportioning valve bypass piston 86. A proportioning valve 88 is located in a proportioning valve cavity 90 and includes piston 92, a body 94 having a valve seat 95, release spring 96 and a poppet 98. Nut 100 both anchors poppet 98 in a stationary position and holds the proportioning valve 88 in place.

A metering valve 102 is located in a metering valve cavity 104 but, in itself, forms no part of the present invention. The details of the mechanism are more completely described in copending application Ser. No. 62,237, which was filed Aug. 5, 1970 in the name of P. B. Shutt by a common assignee, and is incorporated herein by reference as necessary for a more detailed understanding of the present invention.

MODE OF OPERATION

Assuming a normal brake application, the vehicle operator depresses pedal 15, which, through pushrod 17 transmits a force to the front hydraulic system piston 14 which upon moving pressurizes the front system pressure chamber 21. This pressure exerts a force on the rear hydraulic system piston 18 which then moves to cause pressurization of the rear system pressure chamber 24. Since the rear system face 50 of the fail piston 42 is larger (i.e., has more effective area) than the fail piston extension face 46, a force, represented by the expression $(A_1 - A_2) P = F$, in which minor frictional force effects are ignored, is exerted on the fail piston 42 toward the right as viewed in FIG. 1 tending to hold it in its base or normal unactuated position. The terms of the expression defining force $F$ are as follows: $A_1$ is the area of the rear system face 50 of the fail piston 42; $A_2$ is the area of the fail piston extension face 46 and $P$ is the fluid pressure in either the front or rear system pressure chambers. With the fail piston in this base position radial projections 34 are located in a depression on camming surface 44 allowing expandable sleeve 30 or lever 36 to lie against the spool section 26 of the rear system piston 18. Electrical contact 58 having an inner extension 60 slides transversely along the outside of expandable sleeve 30 or lever 36 during brake application and release with no axial motion of the electrical contact 58. Passageway 66 is open, notch 62 is centered over toggle valve stem 68 allowing toggle valve 70 to remain closed, and outer extension 64 is not touching indicator contact 72. The circuit from battery 76 through indicator 74 to ground 77 is therefore open and the failure indicator 74 does not function.

As more force is exerted on pistons 14 and 18 by the operator through pedal 15 and pushrod 17, the pressures in front system pressure chamber 21 and rear system pressure chamber 24 continue to rise. In the case of the rear braking system, this pressure is transmitted directly to the rear brakes 23 until a predetermined pressure is reached, indicating a braking intensity such that a considerable portion of the weight of the vehicle has been shifted to the front wheels, whereupon with further pressure increase, proportioning valve body 94, urged by the pressure of the fluid against the bottom side of proportioning valve piston 92, moves upward as viewed in FIG. 1 against proportioning valve release spring 96, thus restricting flow through proportioning valve seat 95. The poppet 98 remains stationary. Therefore, a progressively decreasing proportion of the fluid pressure generated in system chamber 24 is allowed to pass to the rear brakes 23. This restriction of the pressure increase allowed to pass to the rear brakes prevents rear wheel lock-up and the concomitant loss of control over the vehicle as weight of the vehicle is shifted to the front axle during rapid deceleration of the vehicle caused by vigorous brake application.

Metering valve 102 more fully described in the aforementioned copending application Ser. No. 62,237 does not immediately pass on pressure from front system chamber 21 to front disc brakes 19. Instead, at some predetermined pressure, approximately equal to that required to move the shoes of rear drum brakes 23 into contact with the drum, the pressure from front system chamber 21 begins to pass to the front system disc brakes, thus actuating front and rear brakes at approximately the same time.

If there is fluid loss, or any cause for pressure loss in the front hydraulic system, front system pressure chamber 21 is not pressurized as the operator depresses pedal 15 causing movement of pushrod 17 and front system piston 14. Piston 14 moves to the left as viewed in FIG. 1 against the front system piston return spring 54 until the fail switch actuation stud 48 encounters fail piston extension 46. As piston 14 movement continues to the left, fail piston 42 is shifted to its fail position (i.e., to the left as viewed in FIG. 1) with radial projections 34 moved out of the depression of camming surface 44 onto the shoulder created by the outside diameter of fail piston 42. Expandable sleeve 30 or lever 36 is then moved radially outwardly from spool section 26 of rear system piston 18 into cavity 28. This movement transmitted through inner extension 60 causes electrical contact 58 to move axially downwardly against contact spring 78, causing passageway 66 to close, notch 62 to encounter toggle valve stem 68 thus opening toggle valve 70, and outer extension 64 to touch indicator contact 72, completing the circuit from battery 76 through indicator 74, indicator contact 76, to electrical ground 77. Indicator 74 then continuously maintains a failure warning to the vehicle operator until the malfunctioning system is repaired and the brakes reapplied. At approximately the same point the fail piston completes its axial travel for failure positioning, front system piston extension 38 encounters shroud 40 causing movement of rear system piston 18 to the left as viewed in FIG. 1 and resulting in rear system pressure chamber 24 pressurization. This pressure is communicated through proportioning valve 88 to the rear wheels of the vehicle and through toggle valve passage 82, past open toggle valve 70 into electrical contact cavity 84 and back through bypass channel 80 to the topside of proportioning valve bypass piston 86 in proportioning valve cavity 90. This pressure in concert with proportioning valve release spring 96 create a force overcoming that created by the fluid pressure acting on proportioning valve piston 92 so that proportioning valve body 94 is held downward, as viewed in FIG. 1, and the proportioning valve remains open to admit a free flow of pressure therethrough and thus provides maximum utilization of the remaining rear brakes regardless of the pressure generated in rear system chamber 24.

If fluid pressure loss occurs in the rear braking system, rear system chamber 24 is not pressurized as the operator depresses pedal 15. Instead, fluid pressure generated in front system chamber 21 and acting on the face of fail piston extension 46, unbalanced by any force on rear system face 50, causes fail piston 42 to move to the left as viewed in FIG. 1 and, as previously explained, failure of the front braking system to energize indicator 74 for warning the operator of the brake system failure continuously until the cause for malfunction has been repaired and the brakes reapplied.

Piston 18, urged by fluid pressure in front system chamber 21, moves to the left as viewed in FIG. 1 until rear system piston extension 25 encounters the end of bore 12 whereupon the pressure may rise in the front system pressure chamber 21 according to the pedal 15 depression force for actuating the remaining front brakes 19.

Upon repair of the cause of failure in either the front or rear braking systems, and a subsequent brake application, fail piston 42 is repositioned in its normal or base position by equal fluid pressures in chambers 21 and 24 acting as previously explained on the unequal area opposed piston faces 46 and 50, respectively. The resulting unbalanced force moves the fail piston 42 to the right as viewed in FIG. 1, thus allowing radial projections 34 to re-enter the depression on camming surface 44. This in turn through radially inward motion of sleeve 30 or lever 36 and axially upward motion as viewed in FIG. 1 of electrical contact 58 cause the indicator 74 to be de-energized and the proportioning valve stem 68 to be freed from the restraint of notch 62, thus allowing positioning spring 73 to return the toggle valve 70 to its normally closed position which then reinstates proportioning valve 88 functionally as previously explained for the rear brakes 23.

I claim:

1. In a fluid motor for use in a vehicle braking system having first and second hydraulic systems:
   a housing defining a bore therewithin;
   pressurizing means for developing fluid pressure within said first and second hydraulic systems, said pressurizing means having first and second pistons in said bore, said first piston being reciprocable with respect to said second piston;
   operator-actuated means operatively connected to said pressurizing means for energizing the same;
   said bore being divided by said pressurizing means into first and second hydraulic chambers;
   first and second outlet passage means in said housing for communicating pressurized fluid from said first and second hydraulic chambers, respectively, to front and rear brakes, respectively;
   pressure delaying means operatively connected to said first outlet passage means for regulating pressure transmission from said first hydraulic chamber to said front brakes;
   fluid pressure responsive pressure proportioning means operatively connected to said second outlet passage means for regulating pressure transmission from said second hydraulic chamber to said rear brakes;
   actuating means operatively connected to said pressure proportioning means for actuating the same to a predetermined open position;
   control means operatively connected to said actuating means and operative in response to a predetermined pressure loss in said first hydraulic pressure chamber for energizing said actuating means;

warning means operatively connected to said control means and adapted to warn a vehicle operator of said pressure loss in said front brake, said warning means having a second bore within said second piston, said second piston including an extension, with a small diameter axial passage therethrough, one end of said second piston defining a shoulder at the juncture of said second bore and said passage;

an external reduced diameter section on said second piston with at least one radial passage extending inwardly therethrough from said external reduced diameter section to said second bore;

a gland threadedly engaging said second bore at the other end of said second piston having an internal stepped bore to present a larger and a smaller portion with a shoulder therebetween;

wherein said control means includes, a third piston reciprocable in said second bore having a pair of opposed faces and a camming surface thereon, each of said first and second hydraulic systems being in communication with one of said faces whereby a predetermined pressure differential between said first and second hydraulic systems will shift said piston;

a movable member disposed around said external reduced diameter section having at least one projection extending radially inwardly through said radial passage for engagement with said camming surface; and wherein said warning means includes electrical contact means abutting said movable member for converting motion of the latter to an electrical signal when a predetermined pressure differential exists between said first and second hydraulic chambers.

2. The invention of claim 1 wherein:

said pressure proportioning means includes fluid pressure responsive proportioning valve means responsive to fluid back pressure from said rear brakes for decreasing the pressure transmission from said second hydraulic chamber to said rear brakes at a predetermined brake application intensity.

3. The invention of claim 1 wherein said second piston is adapted to relocate said third piston to a predetermined position upon restoration of equal pressures in said first and second chambers.

4. The invention of claim 1 wherein said movable member comprises a radially expanding sleeve.

5. The invention of claim 1 wherein said movable member comprises a lever.

6. The invention of claim 4 wherein said radially expanding sleeve is formed of a resilient material and includes a cut through the wall of said sleeve coaxial with said sleeve from one end of said sleeve to the other for allowing expansion of said sleeve.

7. The invention of claim 4 wherein said radially expandable sleeve is formed with a series of axial cuts extending over the major portion of the length of said sleeve, each successive axial cut through the wall of said sleeve alternatively extending to one end of said sleeve and the next to the other end of said sleeve.

8. The invention of claim 2 wherein:

said housing having a second bore with a conical seat on the apex of said second bore and an annular piston at its outer periphery slidably received in said outlet passage of said second hydraulic chamber;

means for affixing a stationary poppet within said outlet passage having a circular conical head for mating with said conical seat; and resilient means located in said outlet passage urging said annular piston toward an open valve position.

9. In a fluid motor for use in a vehicle braking system having first and second hydraulic systems:

a housing defining a bore therewithin;

pressurizing means for developing fluid pressure within said first and second hydraulic system;

operator-actuated means operatively connected to said pressurizing means for energizing the same;

said bore being divided by said pressurizing means into first and second hydraulic chambers;

first and second outlet passage means in said housing for communicating pressurized fluid from said first and second hydraulic chambers, respectively, to front and rear brakes, respectively;

pressure delaying means operatively connected to said first outlet passage means for regulating pressure transmission from said first hydraulic chamber to said front brakes;

fluid pressure responsive pressure proportioning means operatively connected to said second outlet passage means for regulating pressure transmission from said second hydraulic chamber to said rear brakes;

actuating means operatively connected to said pressure proportioning means for actuating the same to a predetermined open position, said actuating means having a fluid pressure responsive means;

control means operatively connected to said actuating means and operative in response to a predetermined pressure loss in said first hydraulic pressure chamber for energizing said actuating means, said control means having a source of pressurized fluid and valve means in flow control relationship therewith for controlling pressurization of said fluid pressure responsive means; and warning means operatively connected to said control means and adapted to warn a vehicle operator of said pressure loss in said front braking system.

10. The invention of claim 9 wherein said valve means is operatively connected to said warning switch means so that said valve means and said warning switch means are simultaneously actuated in response to said pressure loss.

11. The invention of claim 10 wherein said operative connection between said valve means and said warning switch means includes electrical contact means.

12. The invention of claim 10 wherein said valve means includes a valve seat and a tilt valve shiftable from said seat to establish fluid communication between said source and said fluid pressure responsive means to actuate said pressure proportioning means to said predetermined open position thereby permitting substantially unrestricted pressure transmission from said second chamber to said rear brakes upon pressure failure in said front braking system.

13. The invention of claim 11 wherein said electrical contact means has a depression located thereon for operably engaging said valve means.

14. The invention of claim 12 wherein said tilt valve is biased.

* * * * *